Patented May 13, 1930

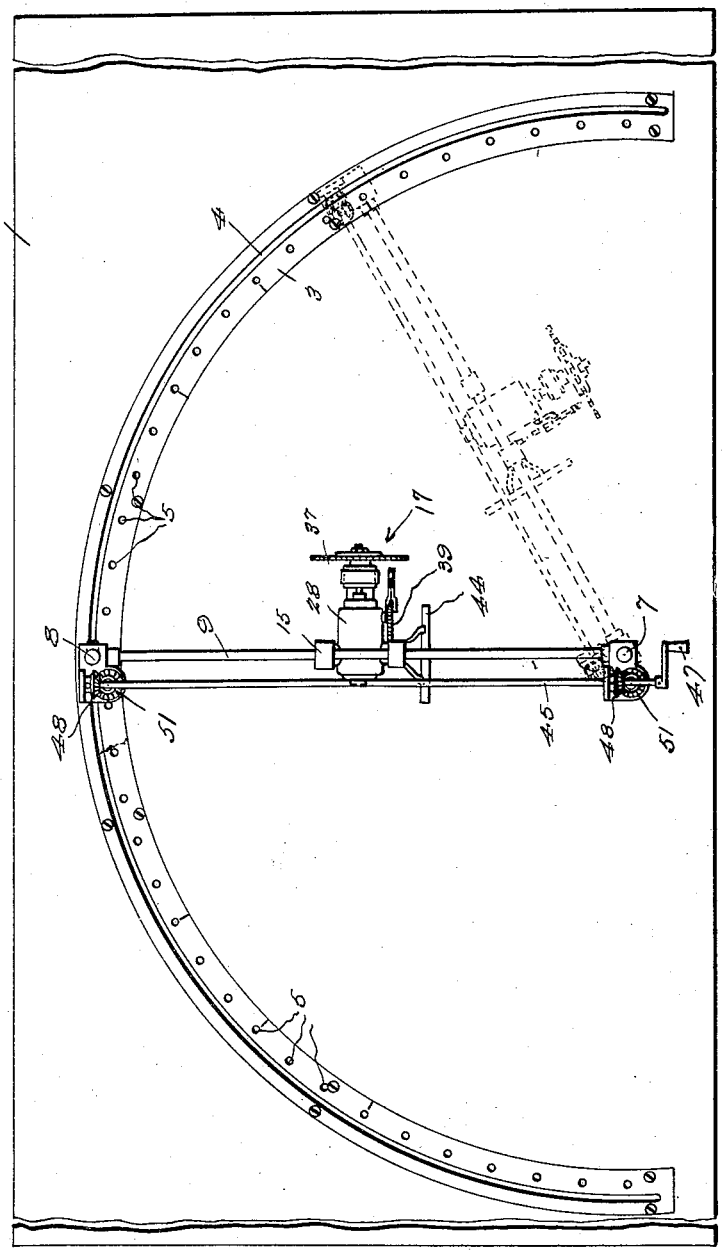

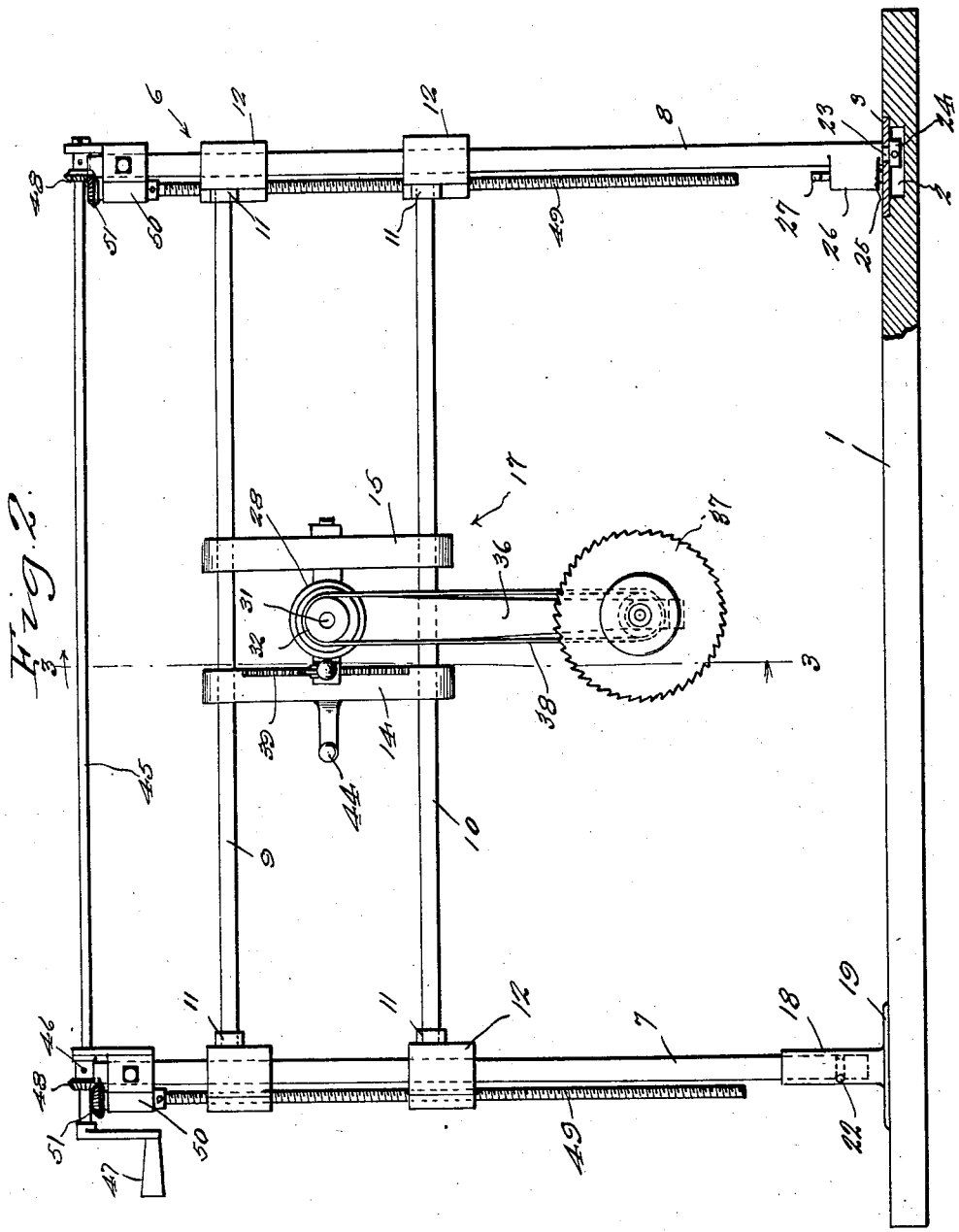

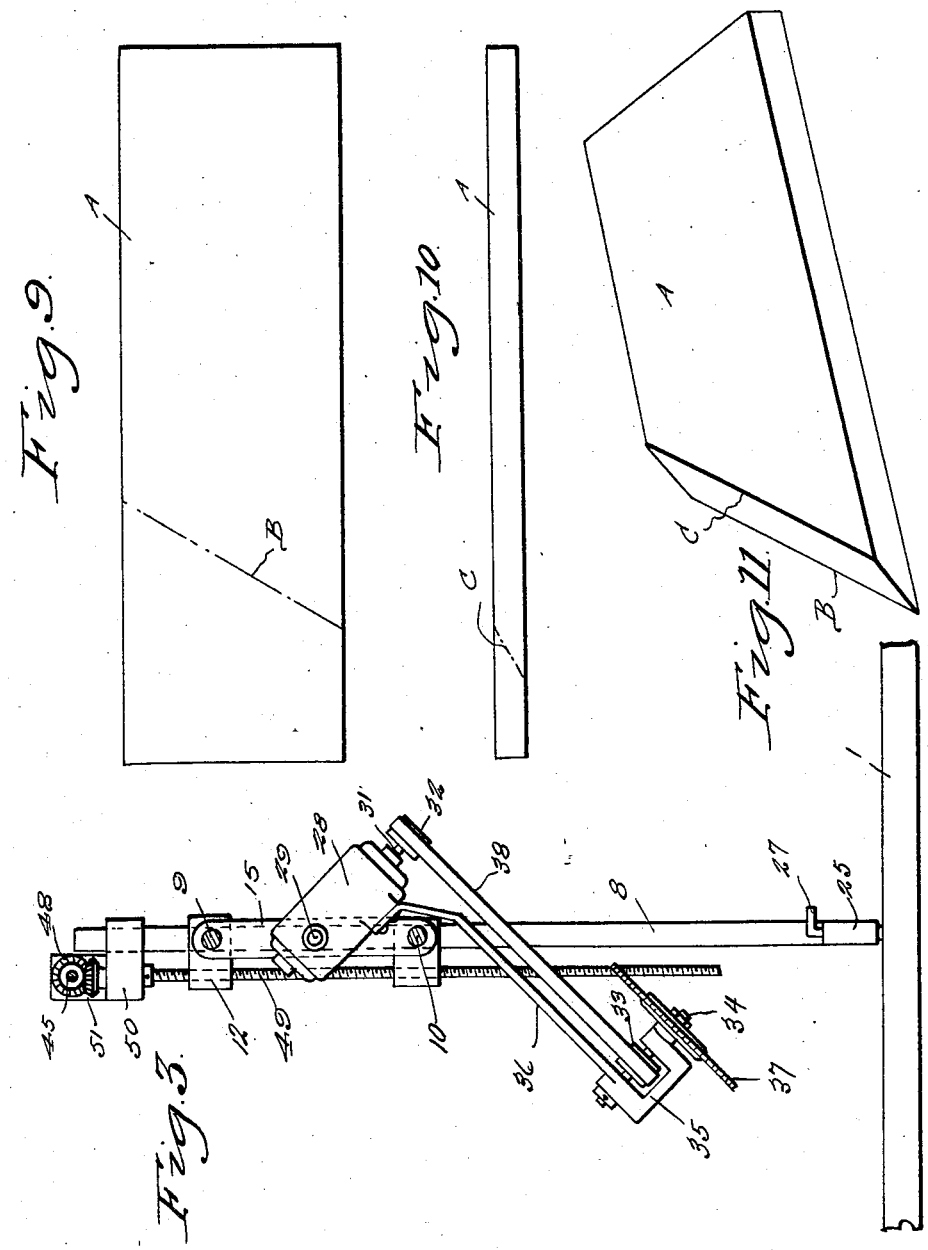

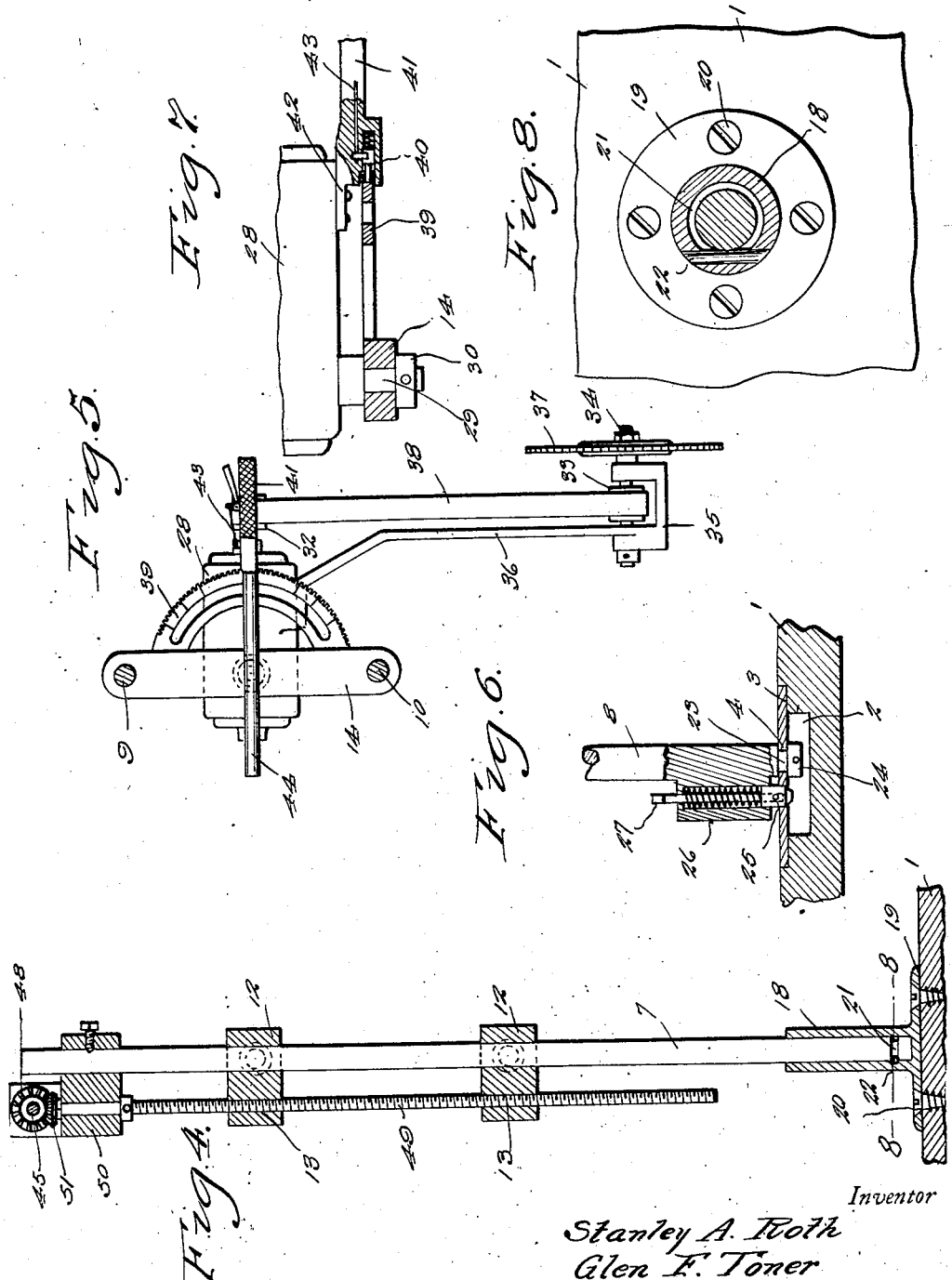

1,758,623

UNITED STATES PATENT OFFICE

STANLEY A. ROTH AND GLEN F. TONER, OF TALLICUM, WASHINGTON

POWER-OPERATED MITER SAW

Application filed July 31, 1928. Serial No. 296,573.

The present invention relates to improvements in wood sawing machines and has reference more particularly to a power operated miter saw.

One of the important objects of the present invention is to provide a saw of the above mentioned character whereby a piece of stock may be cut off at any predetermined angle, said material being further capable of being beveled or chamfered during the angular cutting operation.

A further object is to provide a miter saw wherein the same includes a pair of interconnected standards on which is supported the saw carriage, one of the standards or uprights being capable of swinging movement in an arc whereby the circular saw may be set to cut the stock placed on the table of the saw machine at a predetermined angle, the saw carriage being of such construction as to permit the saw blade to be tilted to any predetermined position for effecting the beveling or chamfering of the material while the same is being cut off.

Still a further object is to provide a power operated miter saw of the above mentioned character which includes means for raising and lowering the saw carriage supporting unit on the vertical uprights or standards.

Still a further object is to provide a structure of the above mentioned character that will at all times be positive in its operation, simple, inexpensive, strong and durable and furthermore readily and easily adjusted.

Other objects and advantages will become apparent during the course of the following description.

In the accompanying drawings, forming a part of this specification, and in which like numerals indicate like parts throughout the same:

Figure 1 is a top plan view of the power operated miter saw embodying our invention, Figure 2 is a side elevation of the structure, a portion of the table being shown in section, Figure 3 is a vertical sectional view taken approximately on the line 3—3 of Figure 2 looking in the direction of the arrows, showing the circular saw disposed in a tilted position, Figure 4 is a view partly in elevation and partly in section showing one of the uprights or standards and its manner of attachment to the table, and also disclosing the vertically disposed threaded shaft for raising and lowering the saw carriage supporting cross bars, Figure 5 is a detail view of the saw carriage, Figure 6 is a detail of the locking means associated with the swinging upright or standard, Figure 7 is a detail showing the locking means for the tiltable saw, Figure 8 is a sectional view taken approximately on the line 8—8 of Figure 4 looking downwardly, Figure 9 is a top plan view of a piece of stock showing diagrammatically the angle at which said material is to be cut off, Figure 10 is an edge elevation of the piece of material showing the bevel or chamfer as formed at the edge being cut off and Figure 11 is a perspective view of the piece of material after the same has been cut by our improved saw.

In the drawing wherein for the purpose of illustration is shown a preferred embodiment of our invention, the numeral 1 designates the table of our structure, the same being formed with an arcuate channel 2 in the upper face thereof as clearly indicated in Figures 1, 2 and 6 and disposed over this channel is the arcuate shaped metallic strip 3, the strip being of a width greater than the width of the channel and as clearly suggested in Figures 2 and 6, the upper face of the table is cut out to receive the edge portion of the relatively wide metallic arcuate shaped strip so that the upper face of the strip will lie flush with the upper face of the table.

Furthermore this arcuate shaped metallic strip is formed in its central portion with the relatively narrow slot 4 that extends for substantially the full length of the strip and the purpose of the same will be presently apparent.

Formed in the inner edge portion of the metallic strip 3 are the spaced holes 5 as shown in Figure 1, and these holes are located at predetermined angles and if desired, the strip may be marked and certain of these holes used to designate the particular angle at which the saw carriage supporting frame may be disposed.

The invention further comprehends the provision of the saw carriage supporting frame designated generally by the numeral 6 and this frame includes a pair of vertically arranged uprights or standards 7 and 8 respectively, each of which comprises an elongated rod and these uprights are interconnected in spaced relation by means of the upper and lower spaced cross bars or rods 9 and 10 respectively.

Each of these cross rods have their ends secured within suitable sockets 11 provided therefor in blocks 12 that are slidably mounted on the respective standards or uprights and each of these blocks is formed in its outer end portion with the vertically disposed threaded bore 13 for a purpose described.

The cross bars 9 and 10 are secured together in spaced relation by means of the vertically disposed flat bars 14 and 15 respectively and these bars 14 and 15 constitute the supporting means for the saw carriage which is designated generally by the numeral 17.

The lower end of the upright or standard 7 is disposed within a tubular socket 18 that extends upwardly from a plate 19 that is secured on the table 1 in a rigid manner by the securing means shown at 20.

This base plate 19 and the socket 18 associated therewith are preferably located centrally of the arcuate slot or channel 2 as suggested very clearly in Figure 1. The lower end portion of the upright or standard 7 is formed with an annular groove 21 in which is disposed the tangentially arranged pin 22 that is driven through the socket member 18 in a transverse manner and suggested more clearly in Figure 8.

By this construction, the vertical standard or uprgiht 7 is capable of rotation in the socket 18 but the same cannot be vertically displaced therefrom.

The other upright or standard 8 is provided at its lower end with a reduced portion 23 and is operable within the slot 4 formed in the metallic strip 3 and extends into the arcuate channel 2 formed in the base or table 1 and a collar or the like shown at 24 is secured on the lower extremity of the reduced portion for disposition beneath the bottom face of the strip 3 whereby said standard or upright 8 can not be vertically displaced and in this manner, the upright 8 is capable of swinging movement in an arc with respect to the upright or standard 7 and for the purpose of securing the swinging portion of the frame 6 in any predetermined position there is provided the spring pressed latch 25 mounted in a suitable housing 26 provided therefor on the lower end portion of the upright 8, the lower end of the latch projecting into one of the openings 5 formed in the strip 3.

The upper end of this latch is formed with an actuating handle 27 to permit said latch to be disengaged from the holes whenever it is desired to swing the upright 8 in an arc.

The saw carriage includes the flat bars 14 and 15 that are slidable along the upper and lower cross bars 9 and 10 and a portable electric motor 28 is formed at opposite sides with the trunnions 29 which are disposed within suitable openings provided therefor in the intermediate portions of the respective bars 14 and 15 as clearly illustrated in Figure 7 whereby said motor is capable of vertical swinging movement between the bars of the saw carriage unit and a collar 30 is secured on the outer end of each trunnion for disposition against the outer face of the respective bar as also clearly shown in Figure 7.

The drive shaft 31 of the electric motor 28 has secured on its outer end the pulley 32 which is in alinement with a similar pulley 33 secured on the intermediate portion of a driven shaft 34 that is journaled through the arms of a substantially U-shaped bracket 35, which bracket is suspended from the forward portion of the motor 28 by means of the suspension arm 36.

A circular saw 37 is removably supported on the forward end of the driven shaft 34 and a belt 38 is trained over the alined pulleys 32 and 33 whereby the saw will be operated when the motor 28 is running.

For the purpose of securing the vertically swinging motor 28 and the saw supported thereby in any angularly adjusted position, there is provided a segmental rack member 39 that extends from the forward edge of the bar 14 and cooperating with the teeth of the segmental rack is a spring pressed pawl 40 supported within the inner end portion of the arm 41 that is fixedly secured to the forward end portion of the motor casing as shown at 42 in Figure 7 and the manually operable means for disengaging the pawl 40 from the teeth of the segmental rack member 39 as illustrated at 43.

This construction provides the means whereby the saw blade 37 may be disposed in any tilted position with respect to the vertical axis as shown in Figure 3 so that a bevel may be formed at the same time the piece of material placed on the table is being cut off at any predetermined angle.

A suitable handle 44 is attached to the bar 14 of the saw carriage unit 17 whereby said saw carriage unit may be manually moved along on the cross bars 9 and 10 for cutting through the stock on the table.

For the purpose of raising and lowering the bars 9 and 10 and the saw carriage unit support thereby, there is provided a cross shaft 45 that extends across the upper end of the uprights or standards 7 and 8 of the frame 6 and suitable bearings 46 are provided for the end portions of this cross shaft on the upper ends of the uprights as also shown very clearly in Figure 2.

An actuating crank 47 is arranged on one end of this cross shaft and suitable bevel gears 48 are keyed on the shaft 45 adjacent the upper ends of the respective uprights or standards.

The raising and lowering means further include the provision of a pair of threaded shafts or rods 49 which have their upper ends unthreaded and disposed through suitable bearings 50 secured on the upper portion of the respective standards or uprights.

A bevel gear 51 is secured on the upper end of each threaded shaft rod 49 for meshing engagement with the respective bevel gear 48 and the shafts 49 are threaded through the alined threaded openings 13 formed in the respective pairs of blocks 12 as clearly suggested in Figure 4. Obviously when the crank 47 is turned in one direction, the screw threaded shafts 49 will be operated in unison to effect the movement of the cross bars 9 and 10 and the saw carriage unit supported thereon in one direction and when the crank is turned in the opposite direction, this will effect the movement of the cross bar and the saw carriage unit mounted thereon in the opposite direction.

In operation the saw A is placed on the table 1 and the angle at which a piece of material to be cut off is determined and then the frame 6 is actuated so that the swinging upright 8 will be disposed at a predetermined angle with respect to the face or forward edge of the stock so that the saw blade 37 will be disposed in the position shown in dotted lines in Figure 1.

At the same time if it is desired to chamfer the stock simultaneously with the cutting off of the same at a predetermined angle, the motor 28 is vertically raised or lowered so that the blade 37 will be tilted to the proper angle and held in position by means of the segmental rack and the locking pawl.

By actuating the handle 44 after the saw has been lowered to the desired depth for cutting through the stock, said saw will cut the stock and thereby form not only a piece of material that is cut off at the angle B but also this particular edge will be chamfered or beveled as shown at C in Figures 10 and 11.

It will thus be seen from the foregoing description, that we have provided a power operated miter saw that will save considerable time and labor and furthermore due to its simplicity can be readily and easily adjusted to cut at any desired angle.

While we have shown the preferred embodiment of our invention, it is to be understood that various changes in the size, shape and arrangement of parts may be resorted to without departing from the spirit of the invention and the scope of the appended claims.

Having thus described our invention, what we claim as new is:

1. In combination, a table formed with an arcuate channel in the upper face thereof, an arcuate strip secured over said channel and formed with a central slot and a series of spaced holes in the edge portion thereof, a standard rotatably mounted at its lower end on the table centrally of the arcuate channel, a second standard having its lower end portion operable through the slot formed in the strip whereby said second standard is capable of swinging movement in an arc with respect to the first mentioned standard, means associated with the second standard for cooperation with the holes in the strip to secure the swingable standard in a predetermined adjusted position, means interconnecting the standards together, a vertically swinging saw carriage unit provided on said interconnecting means, and means for raising and lowering the saw carriage unit.

2. In combination, a table formed with an arcuate channel in the upper face thereof, an arcuate strip secured over said channel and formed with a central slot and a series of spaced holes in the edge portion thereof, a standard rotatably mounted at its lower end on the table centrally of the arcuate channel, a second standard having its lower end portion operable through the slot formed in the strip whereby said second standard is capable of swinging movement in an arc with respect to the first mentioned standard, means associated with the second standard for cooperation with the holes in the strip to secure the swingable standard in a predetermined adjusted position, upper and lower horizontal cross bars connecting the standards, vertical cross bars connecting the upper and lower horizontal cross bars, a saw carriage unit mounted between the vertical cross bars, said vertical cross bars being capable of slidable movement along the upper and lower horizontal cross bars, and means for raising and lowering the inner connected upper and lower horizontal cross bars.

3. In combination, a table formed with an arcuate channel in the upper face thereof, an arcuate strip secured over said channel and formed with a central slot and a series of spaced holes in the edge portion thereof, a standard rotatably mounted at its lower end on the table centrally of the arcuate channel, a second standard having its lower end portion operable through the slot formed in the strip whereby said second standard is capable of swinging movement in an arc with respect to the first mentioned standard, means associated with the second standard for cooperation with the holes in the strip to secure the swingable standard in a predetermined adjusted position, upper and lower horizontal cross bars connecting the standards, vertical cross bars connecting the upper and lower horizontal cross bars, a saw carriage unit mounted between the vertical cross bars, said vertical cross bars being capable of slidable movement along the upper and lower horizontal cross bars, and means for raising and lowering the inner connected upper and lower horizontal cross bars, said saw carriage unit being capable of vertical swinging movement between the vertically disposed cross bars, a segmental rack member extending forwardly from one of the vertical cross members, and a pawl carried by the motor for engagement with the segmental rack to secure the saw carriage unit in any tilted position.

In testimony whereof we affix our signatures.

STANLEY A. ROTH.
GLEN F. TONER.